(12) United States Patent
Wegmann et al.

(10) Patent No.: US 9,220,124 B2
(45) Date of Patent: Dec. 22, 2015

(54) ENHANCED CONNECTION RECOVERY METHOD FOR MULTI-RAT DEPLOYMENTS

(75) Inventors: Bernhard Wegmann, Holzkirehen (DE); Dirk Rose, Munich (DE); Richard Waldhauser, Munich (DE); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/988,073

(22) PCT Filed: Nov. 18, 2010

(86) PCT No.: PCT/EP2010/067769
§ 371 (c)(1),
(2), (4) Date: Jul. 11, 2013

(87) PCT Pub. No.: WO2012/065646
PCT Pub. Date: May 24, 2012

(65) Prior Publication Data
US 2013/0295939 A1 Nov. 7, 2013

(51) Int. Cl.
*H04W 76/02* (2009.01)
*H04W 36/14* (2009.01)

(52) U.S. Cl.
CPC ............ *H04W 76/028* (2013.01); *H04W 36/14* (2013.01)

(58) Field of Classification Search
CPC .......... H04W 76/028; H04W 28/0247; H04W 72/0426; H04W 36/0061; H04W 24/10; H04W 88/06; H04W 8/24; H04L 29/14
USPC .......... 455/436, 450, 525, 423; 370/252, 331, 370/329
See application file for complete search history.

(56) References Cited

U.S. PATENT DOCUMENTS

| | | | |
|---|---|---|---|
| 2008/0261600 A1 | 10/2008 | Somasundaram et al. | 455/436 |
| 2008/0280615 A1 | 11/2008 | Vinayakray-Jani | 455/437 |
| 2009/0137265 A1* | 5/2009 | Flore et al. | 455/525 |
| 2012/0094656 A1* | 4/2012 | Huang et al. | 455/423 |

FOREIGN PATENT DOCUMENTS

| | | |
|---|---|---|
| EP | 2 224 768 A1 | 9/2010 |
| GB | 2 464 137 A | 4/2010 |

OTHER PUBLICATIONS

TS 36.300 V10.0.0 (Release 10), 3rd Generation Partnership Project-;Technical Specification Group Radio Access Network; Evolved Universal Terrestrial Radio Access (E-UTRA) and Evolved Universal Terrestrial Radio Access Network (E-UTRAN); Overall description, Stage 2, (Jun. 2010) Stage 2 (Release 10) (183 pages).

* cited by examiner

*Primary Examiner* — Phuoc H Doan
(74) *Attorney, Agent, or Firm* — Harrington & Smith

(57) ABSTRACT

A method is proposed by which a mobile device is controlled, which is capable of establishing connection with a first and at least a second type radio access network, the first and the second type radio access network operating with different radio access technologies. In case a radio link failure is detected, when the mobile device was connected with the first type radio access network, it is tried to re-establish connection with the first type radio access network. In case reestablishing the connection with the first type radio access network was not successful, it is tried to re-establish connection with the second type radio access network.

14 Claims, 4 Drawing Sheets

ENHANCED CONNECTION RECOVERY METHOD FOR MULTI-RAT DEPLOYMENTS

FIELD OF THE INVENTION

The present invention relates to apparatuses, methods and a computer program product for enhancing connection recovery for multi-radio access technology (RAT) deployments.

RELATED BACKGROUND ART

The following meanings for the abbreviations used in this specification apply:
3GPP $3^{rd}$ generation partnership project
BSC Base station controller
eNode-B LTE base station (also referred to as eNB)
E-UTRAN Evolved universal terrestrial radio access network
GSM Global system for mobile communications
LTE Long term evolution
NRT Non-real time
RAN Radio access network
RAT Radio access technology
RIM RAN information management
RLF Radio link failure
RNC Radio network controller
RRC Radio resource control
RSRP Reference signal received power
UE User equipment
UMTS Universal mobile telecommunications system
UTRAN UMTS terrestrial radio access network Embodiments of the present invention relate to mobile radio communications with focus on inter radio access technique (inter-RAT) operation, for instance, coverage limited handover between overlaying radio access networks. Embodiments of the present invention aim on inter-RAT handover improvement.

Namely, in near future, LTE will be deployed as second or third radio access network (RAN) of an operator. In most areas several radio technologies will exist as overlay networks. In the beginning, LTE system will only be deployed at some hotspot area embedded in wide-ranging legacy 2G/3G overlay coverage. An example for this is illustrated in FIG. 8. Many inter-RAT handovers will happen either due to the limited LTE coverage or triggered by dedicated operator policies in terms of service or load based traffic steering.

The problem underlying the present application relates to a missing appropriate procedure for connection re-establishment in case of RLF detection in a multi-RAT environment.

3GPP standard already foresees a specific recovery strategy for UE that detects a radio link failure (RLF). After detecting RLF, the UE stays in RRC connected mode and tries to recover by sending a RRC CONNECTION RE-ESTABLISHMENT REQUEST message to the next best serving eNB staying on same carrier frequency, i.e. UE is working in intra-RAT/intra-frequency mode. The re-establishment method allows a rather fast recovery of the connection without lengthy authentication procedures and security activation provided that the concerned cell is prepared, i.e. it has a valid UE context. If there is no UE context prepared at the targeted eNB, the UE changes to status RRC_IDLE.

FIG. 9 shows the intra-LTE recovery phases as specified in 3GPP TS 36.300. As shown, in a first phase, initiated by radio link quality problem detection (signal quality of the serving cell falls below a certain threshold) operation is continued and it is checked if the signal quality recovers within a time frame T1. If the UE does not recover in the same cell, i.e. timer T1 expires, it is determined that a radio link failure (RLF) is present and the second phase, (timed by timer T2), is started where the UE, still in status RRC-connected, is selecting a different cell from the same eNB and tries to resume activity by sending the RRC Connection re-establishment. If this is also not successful, the UE goes back to idle (RRC_IDLE) and has to pass to the normal re-connection procedure.

The problem is that in case of multi-RAT layout an appropriate procedure for connection re-establishment to another RAT in case of RLF detection is missing.

SUMMARY OF THE INVENTION

The present invention and its embodiments aim at solving the above problem.

According to an exemplary first aspect of the present invention, there is provided a method by which a mobile device is controlled, which is capable of establishing connection with a first and at least a second type radio access network, the first and the second type radio access network operating with different radio access technologies. In case a radio link failure is detected, when the mobile device was connected with the first type radio access network, it is tried to re-establish connection with the first type radio access network. In case re-establishing the connection with the first type radio access network was not successful, it is tried to re-establish connection with the second type radio access network.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As mentioned above, embodiments of the present invention relate to mobile radio communications with focus on inter radio access technique (inter-RAT) operation. More specifically, according to embodiments of the present invention, a UE being in a multi-RAT environment and is already monitoring another RAT or an inter-RAT handover (HO) has been initiated already and is achieving a radio link failure (RLF) should be able to re-establish the connection in a prepared or unprepared cell using another RAT than that used before the RLF. The knowledge in the UE of already collected inter-RAT measurements previous to the RLF is exploited to accelerate the establishment of the new connection.

Figure 9:
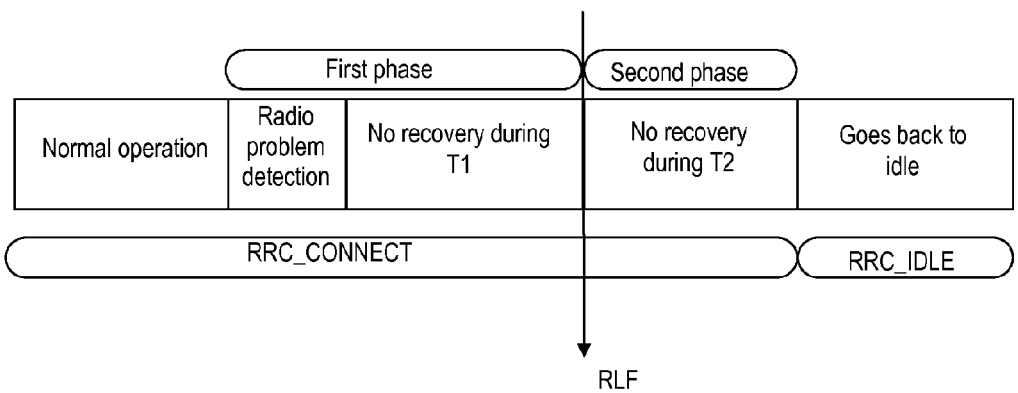
FIG. 9 shows recovery phases associated with a radio link failure in E-UTRAN according to the prior art.

Namely, currently, if the RLF happens in a multi-RAT environment and maybe even an inter-RAT handover has been initiated (e.g. UE context has been successfully transferred from LTE to 3G), the UE now tries to re-establish in the previously connected RAT and may finally end up in status RRC_IDLE, as shown in FIG. 9. The current standard does not provide means to start recovery (i.e. re-establishment) in the new RAT. Therefore, the UE has to setup a new connection with all authentication and security procedures even though the UE context may already be available in the new RAT, e.g. because of handover preparation signaling.

An intra-RAT recovery method is also applied in case the UE is in UTRAN connected state. When an RLF is detected, the UE selects a suitable UTRAN cell and informs the corresponding radio network controller (RNC) via a cell update message. An RRC re-establishment procedure within the used RAT (here: UTRAN) is attempted if the appropriate timer (T314 or T315 as defined in UTRAN) has not expired.

Fact is that a RRC re-establishment method is not considered in the inter-RAT case. However, as long as higher protocol layers are not released and UE is able to set-up a connection in another RAT after it was dropped on lower layer, for non-real time (NRT) services with uncritical delay requirements it should be possible that the connection could be hold what can be interpreted as sort of "higher layer re-establishment". But this approach is completely impracticable for delay constraint services.

Embodiments of the present application overcome this problem.

In the following, a first embodiment is described in general by referring to FIG. 1.

Figure 1:
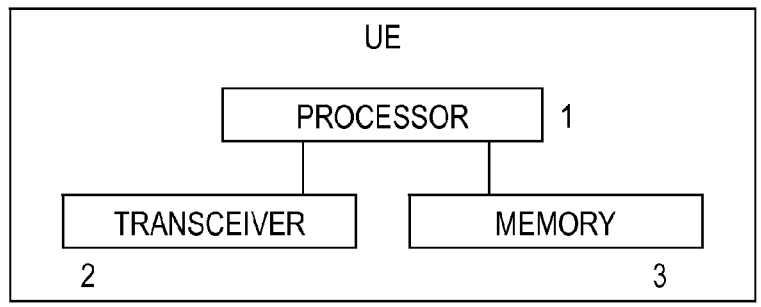
FIG. 1 shows a basic structure of a user equipment (UE) according to a first embodiment.

FIG. 1 shows an apparatus, which may be or may be part of a user equipment (UE), for example. The UE, which is an example for a mobile device, comprises a processor (processing means) 1, a transceiver (transceiving means) 2 and a memory 3. The transceiver 2 is capable of establishing connection with a first and at least a second type radio access network. The first and the second type radio access network operate with different radio access technologies (RAT), as mentioned above. The processor 1 is to detect a radio link failure (RLF). In case a radio link failure is detected when the transceiver was connected with the first type radio access network, the processor tries to re-establish connection with the first type radio access network by means of the transceiver. In case re-establishing the connection with the first type radio access network was not successful, the processor 1 tries to connect with the second type radio access network by means of the transceiver.

Figure 2:
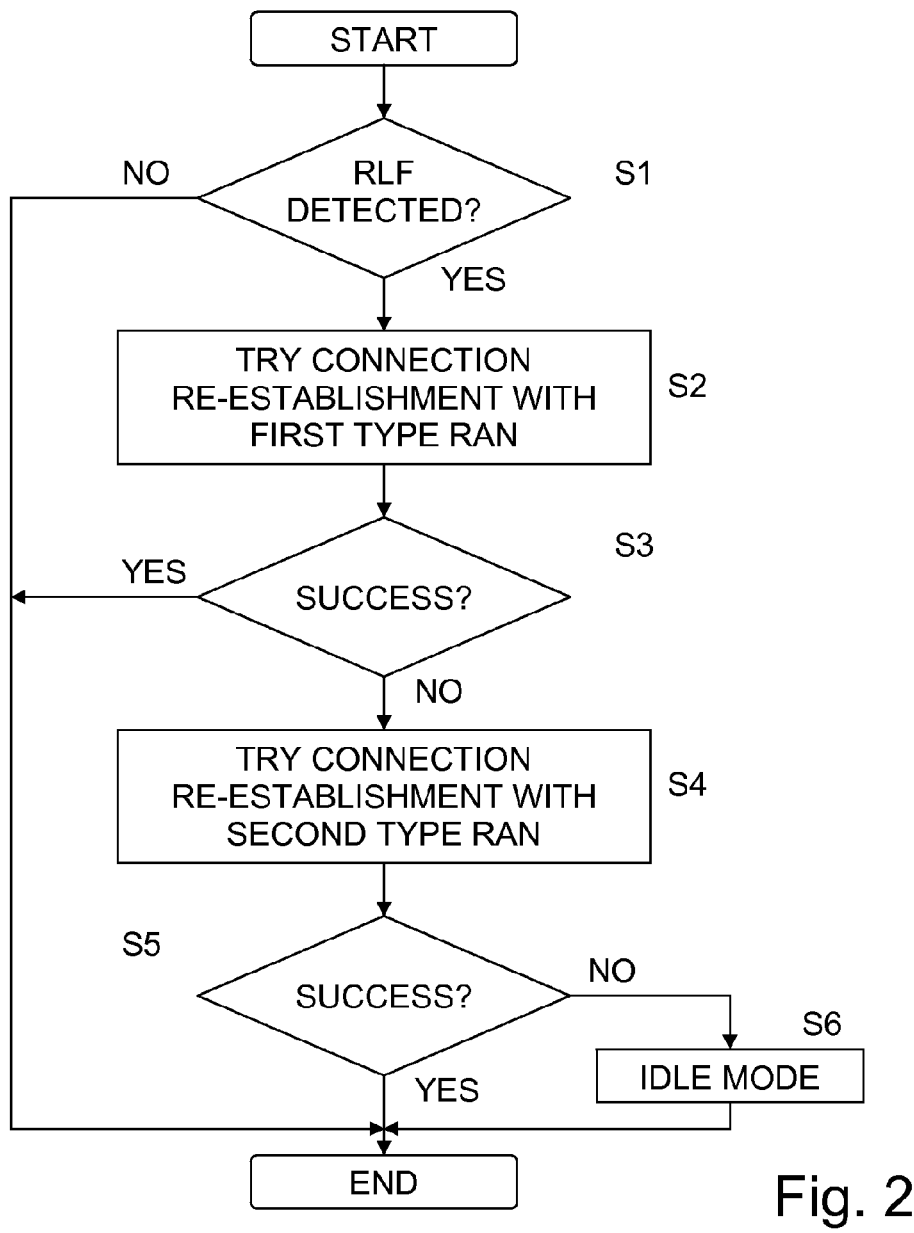
FIG. 2 shows a process according to the first embodiment.

In the following, a basic process according to an embodiment of the present invention is described by referring to FIG. 2.

The process serves to control an apparatus (such as the UE described above) capable of establishing connection with a first and at least a second type radio access network operating with different radio access technologies. In step S1, it is checked whether a radio link failure is detected. In case a radio link failure is detected when the apparatus was connected with the first type radio access network, it is tried to re-establish connection with the first type radio access network in step S2. In case re-establishing the connection with the first type radio access network was not successful (NO in step S3), it is tried to connect with the second type radio access network by means of the transceiver in step S4. If this was successful (YES in step S5), the process ends.

In the following, the first embodiment is described in some more detail.

Figure 3:
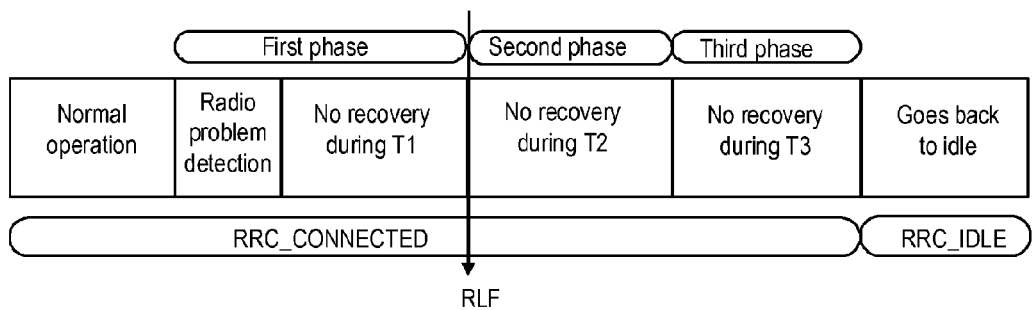
FIG. 3 illustrates timing of an inter-RAT connection re-establishment according to the first embodiment.

This invention proposes an advanced recovery method applicable to multi-RAT environment. The recovery phase, which is described above for the prior art case by referring to FIG. 9, is extended by a third part trying connection re-establishment to another RAT before the UE goes into idle mode, as shown in FIG. 3. The proposed principle is applicable to all RATs albeit the RAT the UE is connected to when RLF is detected.

The proposed procedure according to the first embodiment is as following:

If an RLF happened before any inter-RAT HO has been initiated or any inter-RAT measurement events have been achieved, UE tries first a re-establishment in the previously used RAT (and carrier frequency), i.e. the second phase is carried out as hitherto (potentially with a shorter timer). If this is successful (YES in step S3 of FIG. 2), the process ends. But if a re-establish to the previous RAT was not successful and the timer (T2) of the second phase has been expired, the new third phase is started where the UE tries a connection re-establishment with another dedicated RAT and dedicated frequency.

That is, in case the connection re-establishment with the other dedicated RAT (the second type radio access network mentioned above) was successful, the process ends. Otherwise (NO in step S5 of FIG. 2), the UE is set into idle mode in step S6 (RRC_IDLE in FIG. 3).

Preferably, the UE knows the target RAT and frequency it has to get in synch in order to keep the phase as short as possible.

According to the present embodiment, the interruption time in case of an inter-RAT handover failure can be significantly reduced to levels which are known from intra-LTE connection re-establishment procedure, i.e. the user would not even perceive any interruption for most of the services. Furthermore, signaling for authentication etc. can be avoided.

If the UE has no information about the target RAT and frequency the third phase is not carried out at all and UE goes into idle mode.

The information about the target RAT and frequency is either derived from previous carried out inter-RAT measurements or from an already received HO command message which contains detailed information about the target RAT and cell (e.g. frequency, scrambling code in case of 3G) or explicitly signaled by network.

The UE should be able to store this information in the memory 3 and to use it in the re-establishment phase three.

In the following, a second embodiment of the present invention is described.

Figure 4:
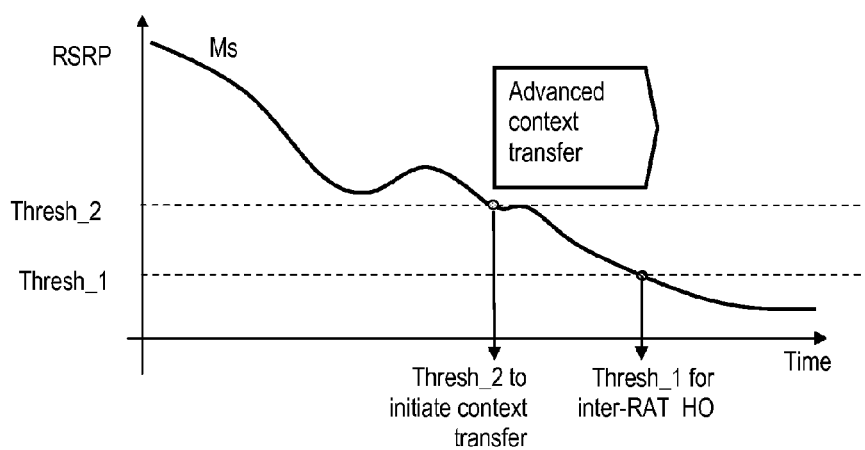
FIG. 4 illustrates introduction of a second threshold for advanced context transfer according to the second embodiment.

As mentioned above, re-establishment is only successful if the UE context is already available at the target-RAT (depending on the target RAT either at eNB or RNC or BSC). In order to ensure the availability of the UE context at the target RAT, according to the second embodiment a second measurement event is introduced which includes a threshold being slightly higher than that for HO trigger event which triggers the context transfer in advance. This is illustrated in FIG. 4. The UE performs the measurements, wherein Ms shown in FIG. 4 is the measured signal from serving node at UE. The UE is reporting a specific event (indicating a preterm context exchange) if a threshold is exceeded. That is, when the signaling strength (reference signal received power (RSRP)) falls below the threshold Thresh_2, a context transfer is initiated. In case the signaling strength falls further below the threshold Thresh_1, a handover to the other RAT (the second type radio access network) is initiated.

The context can be also sent out to several potential target eNBs or RATs to increase the probability of availability. Thus, the subsequent HO preparation message (triggered by a further measurement event, i.e., when the signaling strength falls below Thresh_1) does not need to contain the UE context again, but a crosscheck if it is available can be performed. In case the advanced context transfer has been spread over several entities a context release indication is sent to those entities being not the HO target.

The connection re-establishment request may include additional information that allows the receiving radio node to identify already present context that is associated with this UE, or otherwise to enable the network to fetch the context from the previous source node of the UE in the other RAT (e.g. via RAN information management (RIM)).

In case the inter-RAT HO from LTE to 3G has been successfully prepared, i.e. the RNC holds the required UE context a fast connection re-establishment can be accomplished even if the targeted NB is not the same which previously has been chosen for inter-RAT HO preparation. The UE context can be easily retrieved for all NodeBs belonging to the same common RNC. Having a controlling node for several base stations provides a further degree of freedom to enable a successful RRC connection re-establishment between RATs.

In order to ensure the availability of the UE context at the target RAT it is proposed to introduce another measurement event with a threshold being slightly higher than that for HO trigger event (FIG. 4). This further measurement event triggers the context transfer in advance, provided that inter-RAT measurements have been already performed. If several neighboring measurements are available, the UE context can be also send out to a set of potential target eNBs or RATs to increase the probability of availability in case of a subsequent inter-RAT handover or connection re-establishment.

With this approach the UE context does not need to be transmitted within the subsequent HO preparation (triggered by the second measurement event in FIG. 4), provided that the target network node is the same or at least one of the set of nodes to which the context has been transmitted in advance. That is, the context transfer as part of the actual handover preparation phase triggered by the second criterion can be neglected. It is noted that a target network node is a candidate for a possible handover of the UE to the second RAT (second type radio access network).

The availability can be also checked with an additional information exchange. Furthermore, in case the pre-term context transfer has been spread over several entities a context release indication is sent to the other entities apart from the target cell. A context release indication may also to be sent to all target network nodes to which the context transfer has been sent in advance in case the second criterion is not reached and, therefore, inter-RAT handover is not triggered within a defined time interval.

Figure 5:
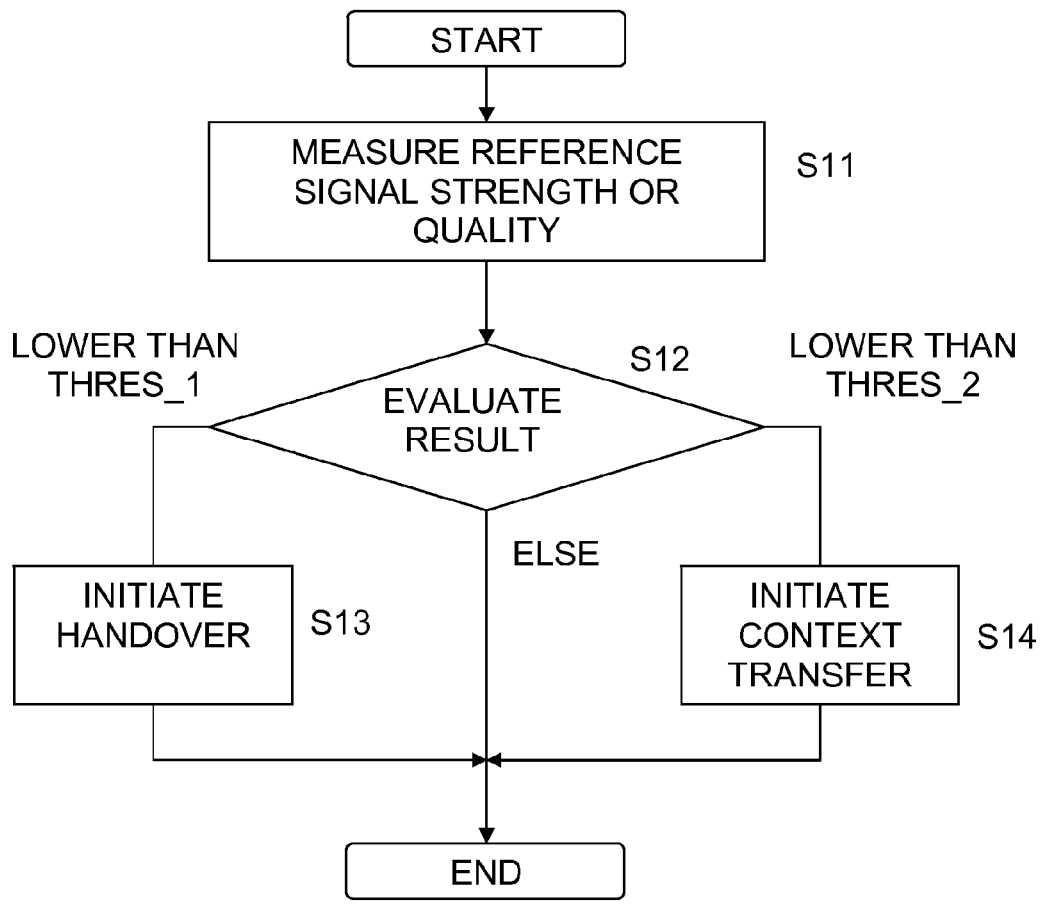
FIG. 5 shows a process according to the second embodiment.

FIG. 5 shows a method carried out according to the second embodiment.

The method serves to ensure the availability of the UE context a case of UE mobility from a first to a second type radio access network, the first and the second type radio access network operating with different radio access technologies, as mentioned above. In step S11, the reference signal strength or quality from a base station is measured at the mobile device (UE), wherein the UE is connected to the first type radio access network. In step S12, the result is evaluated. In case the reference signal strength or quality of the measured signals fulfils a first criterion (CONTEXT_TRANSFER_EVENT) defined by a threshold or a combination of at least two thresholds, a context transfer from the serving mobile device to the targeted network node of the second type radio access network is initiated. That is, in case the reference signal strength or quality falls below the threshold THRESH_1 defined above in connection with FIG. 4, the context transfer is initiated, as shown in step S14. In case the reference signal strength or quality is further decreasing and falls below the threshold THRESH_2 defined above in connection with FIG. 4, the inter-RAT handover is initiated, as shown in step S13. The inter-RAT handover will be triggered by a more stringent second criterion (INTER-RAT_HANDOVER_EVENT) (e.g. B2 in case of LTE) compared to the first criterion with more stringent thresholds against the reference signal strength or quality of the measured signals. Therefore, the CONTEXT_TRANSFER_EVENT is occurring before INTER-RAT_HANDOVER_EVENT.

The method as described above and shown in FIG. 5 may be carried out by a suitable network control node, depending on in which RAT the network control element is located. That is, in LTE this may be an eNodeB, in 3G this may be a RNC and in 2G, this may be a BSC, for example. The network control node receives the measurement results of the UE (measured in step S11) and carries out the evaluation as shown in step S12 and the following steps.

Figure 6:
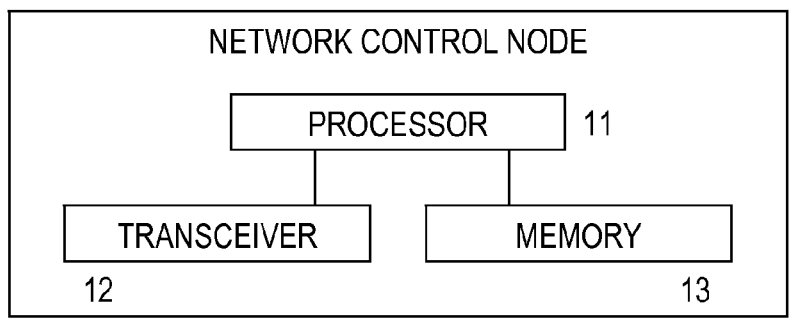
FIG. 6 shows a basic configuration of a network control node according to the second embodiment.

A basic configuration of the network control node is shown in FIG. 6. The network control node comprises a processor 11 and a transceiver 12. The transceiver 12 receives information regarding a detected reference signal strength and/or quality from base stations detected by a mobile device connected to a first type radio access network (first RAT). In case the signal strength or quality of the measured signals fulfils a first criterion with is less stringent than an actual criterion for a handover from the first to the second type radio access network, the processor 11 initiates a transfer of a context of the mobile device to the second type radio access network.

Optionally, the network control node may comprise a memory 13, in which programs, data etc. are stored.

As already described above, the target network node may have a possibility to check whether it has the UE context available, and, if not, to retrieve the UE context.

Figure 7:
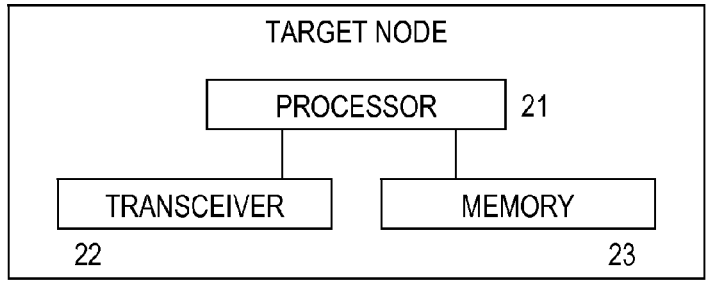
FIG. 7 shows a basic configuration of a target network node according to the second embodiment.
Figure 8:
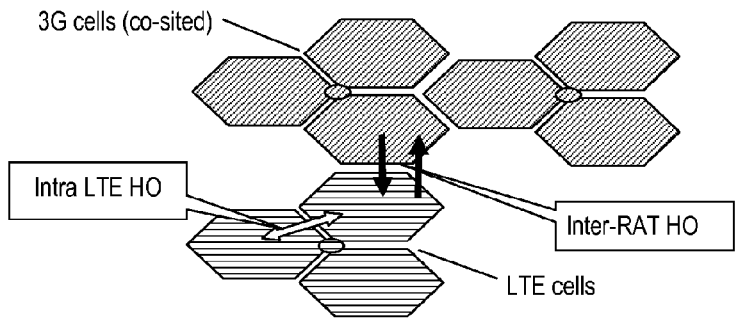
FIG. 8 illustrates an overlay scenario of two different RATs.

A basic configuration of the target network node for this case is shown in FIG. 7. The target network node comprises a processor 21 and a transceiver 22. The transceiver 22 receives a connection re-establishment request from a mobile node, which performs a handover from a first type radio access network to a second type radio access network, the first and the second type radio access network operating with different radio access technologies. The processor 21 is configured to identify already present context that is associated with the mobile device based on information included the connection re-establishment request.

Hence, the target network node can easily check whether the context information of the UE is already present in the target network node. If not, the processor can use the information included in the connection re-establishment request to fetch the context from a previous source node of the mobile device in the first RAT (e.g., eNodeB, RNC or the like).

Optionally, the target network node may comprise a memory 23, in which programs, data etc. are stored.

The procedure has been described as generic as possible with some examples for the most prominent use case LTE to 3G. However, the principles according to the embodiments may also be applied to all kind of inter-RAT handovers, e.g.
3G←→LTE
LTE←→2G
2G←→3G
etc.

Thus, according to embodiments of the invention it is possible to quickly re-establish connection in case of a radio link failure by using also a different RAT.

According to a first aspect of several embodiments of the invention, a method is provided which comprises
controlling a mobile device capable of establishing connection with a first and at least a second type radio access network, the first and the second type radio access network operating with different radio access technologies, the method further comprising
detecting a radio link failure,
trying, in case a radio link failure is detected when the mobile device was connected with the first type radio access network, to re-establish connection with the first type radio access network, and,
in case re-establishing the connection with the first type radio access network was not successful, trying to re-establish connection with the second type radio access network.

The method may further comprise
checking whether information is available regarding a target network node of the second type radio access network and/or information regarding a frequency to be used to start the re-establishing process with the second type radio access network, and,
in case the information is not available, setting the apparatus in an idle mode in case re-establishing of the convection with the first type radio access network was not successful.

The method may further comprise determining that a radio link failure has occurred when a radio problem is detected and a first timer has expired since detection of the radio problem.

The method may further comprise determining that re-establishing the connection with the first type radio access network was not successful when a second timer has expired since detection of the radio link failure.

The method may further comprise setting the apparatus in an idle mode in case trying a connection re-establishment with the second type radio access network was not successful until a third timer has expired.

The method may further comprise
obtaining the information based on
previously carried out inter radio access technology measurements,
a received handover command message containing detailed information about the second type radio access network and a cell to which a handover is to be carried out, and/or
explicit signalling from the network, and to store the information in a memory.

The connection re-establishment request may include additional information that allows the target node to identify already present context that is associated with the mobile device.

The method may further comprise using the information of connection re-establishment request to enable the target network node to fetch the context from the previous source node of the mobile node in the first type radio access network.

According to a second aspect of several embodiments of the invention, a method is provided which comprises
receiving information regarding a detected reference signal strength and/or quality from base stations detected by a mobile device connected to a first type radio access network, and
initiating a transfer of a context of the mobile device to a second type radio access network in case the signal strength or quality of the measured signals fulfils a first criterion with is less stringent than an actual criterion for a handover from the first to the second type radio access network, the first and the second type radio access network operating with different radio access technologies.

The first and the second aspect may be modified as follows:
The method may further comprise
detecting reference signal strength and/or quality from base stations of the first and second radio access technologies, and
initiating a transfer of a context of the mobile device to the second radio access technology in case the signal strength or quality of the measured signals fulfils a first criterion with is less stringent than an actual criterion for a handover from the first to the second type radio access network.

The method may further comprise
initiating a handover in case the reference signal strength or quality of the measured signals fulfils a second criterion, and
wherein the second criterion is more stringent than the first criterion.

The context transfer may be performed to a target network node, which is a candidate for a possible handover, of the second type radio access network.

The context transfer may be performed to a set of potential target network nodes.

The context transfer as part of the actual handover preparation phase triggered by second criterion may be neglected.

The method may further comprise
performing an information exchange to check the availability of the context at the target network node.

The method may further comprise
sending a context release indication to the other entities apart from the target network node.

The method may further comprise
sending a context release indication to all target network nodes to which the context transfer has been sent in advance in case the second criterion is not reached and, therefore, a handover from the first to the second type radio access network is not triggered within a defined time interval.

According to a second aspect of several embodiments of the invention, a method is provided which comprises
receiving a connection re-establishment request from a mobile node, which performs a handover from a first type radio access network to a second type radio access network, the first and the second type radio access network operating with different radio access technologies,
wherein the connection re-establishment request includes additional information which allow to identify already present context that is associated with the mobile device.

The method may further comprise using the information of the connection re-establishment request to fetch the context from the previous source node of the mobile node in the first type radio access network.

According to a fourth aspect of several embodiments of the invention, an apparatus is provided which comprises
a processor and
a transceiver capable of establishing connection with a first and at least a second type radio access network, the first and the second type radio access network operating with different radio access technologies, wherein the processor is configured to detect a radio link failure, and, in case a radio link failure is detected when the transceiver was connected with the first type radio access network, to try to re-establish connection with the first type radio access network by means of the transceiver, and, in case re-establishing the connection with the first type radio access network was not successful, to try to re-establish the connection with the second type radio access network by means of the transceiver.

The processor may be configured to check whether it has available information regarding the second type radio access network and/or information regarding a frequency to be used for connecting with the second type radio access network, and, in case it does not comprise the information, to enter an idle mode in case re-establishing the connection with the first type radio access network was not successful.

The processor may be configured to determine that a radio link failure has occurred when a radio problem is detected and a first timer has expired since detection of the radio problem.

The processor may be configured to determine that re-establishing the connection with the first type radio access network was not successful when a second timer has expired since detection of the radio link failure.

The processor may be configured to enter an idle mode in case trying a connection re-establishment with the second type radio access network was not successful until a third timer has expired.

The processor may be configured to obtain the information based on previously carried out inter radio access technology measurements, a received handover command message containing detailed information about the second type radio access network and a cell to which a handover is to be carried out, and/or explicit signalling from the network, and to store the information in a memory.

The processor may be configured to detect reference signal strength and/or quality from base stations of the first and second radio access technologies, and to send the detection result to a network control node.

According to a fifth aspect of several embodiments of the invention, an apparatus is provided which comprises a transceiver and a processor, wherein the transceiver is configured to receive information regarding a detected reference signal strength and/or quality from base stations detected by a mobile device connected to a first type radio access network, and the processor is configured to initiate a transfer of a context of the mobile device to a second type radio access network in case the signal strength or quality of the measured signals fulfils a first criterion with is less stringent than an actual criterion for a handover from the first to the second type radio access network, the first and the second type radio access network operating with different radio access technologies.

The processor may be configured to initiate a handover in case the reference signal strength or quality of the measured signals fulfils a second criterion, and wherein the second criterion is more stringent than the first criterion.

The processor may be configured to perform the context transfer to a target network node, which is a candidate for a possible handover, of the second type radio access network.

The processor may be configured to perform the context transfer to a set of potential target network nodes.

The processor may be configured to neglect the context transfer as part of the actual handover preparation phase triggered by second criterion.

The processor may be configured to perform an information exchange to check the availability of the context at the target network node.

The processor may be configured to send a context release indication to the other entities apart from the target network node.

The processor may be configured to send a context release indication to all target network nodes to which the context transfer has been sent in advance in case the second criterion is not reached and, therefore, a handover from the first to the second type radio access network is not triggered within a defined time interval.

According to a sixth aspect of several embodiments of the invention, an apparatus is provided which comprises a transceiver and a processor, wherein the transceiver is configured to receive a connection re-establishment request from a mobile node, which performs a handover from a first type radio access network to a second type radio access network, the first and the second type radio access network operating with different radio access technologies, and the processor is configured to identify already present context that is associated with the mobile device based on information included the connection re-establishment request.

The processor may be configured to use the information of the connection re-establishment request to fetch the context from the previous source node of the mobile node in the first type radio access network.

According to a seventh aspect of several embodiments of the present invention, a computer program product is provided which comprises code means for performing a method according to any one of the first to third aspects and their modifications when run on a processing means or module.

The computer program product may comprise a computer-readable medium on which the software code portions are stored, and/or wherein the program is directly loadable into a memory of the processor.

According to an eighth aspect of several embodiments of the invention, an apparatus is provided which comprises means for establishing connection with a first and at least a second type radio access network, the first and the second type radio access network operating with different radio access technologies, means for detecting a radio link failure, and, means for trying, in case a radio link failure is detected when the transceiver was connected with the first type radio access network, to re-establish connection with the first type radio access network by means of the transceiver, and, means for trying, in case re-establishing the connection with the first type radio access network was not successful, to re-establish the connection with the second type radio access network by means of the transceiver.

The apparatus may further comprise means for checking whether it has available information regarding the second type radio access network and/or information regarding a frequency to be used for connecting with the second type radio access network, and, means for entering, in case it does not comprise the information, an idle mode in case re-establishing the connection with the first type radio access network was not successful.

The apparatus may further comprise means for determining that a radio link failure has occurred when a radio problem is detected and a first timer has expired since detection of the radio problem.

The apparatus may further comprise means for determining that re-establishing the connection with the first type radio access network was not successful when a second timer has expired since detection of the radio link failure.

The apparatus may further comprise means for entering an idle mode in case trying a connection re-establishment with the second type radio access network was not successful until a third timer has expired.

The apparatus may further comprise means for obtaining the information based on
 previously carried out inter radio access technology measurements,
 a received handover command message containing detailed information about the second type radio access network and a cell to which a handover is to be carried out, and/or
 explicit signalling from the network, and to store the information in a memory.

The apparatus may further comprise
 means for detecting reference signal strength and/or quality from base stations of the first and second radio access technologies, and
 means for sending the detection result to a network control node.

According to a ninth aspect of several embodiments of the invention, an apparatus is provided which comprises
 means for receiving information regarding a detected reference signal strength and/or quality from base stations detected by a mobile device connected to a first type radio access network, and
 means for initiating a transfer of a context of the mobile device to a second type radio access network in case the signal strength or quality of the measured signals fulfils a first criterion with is less stringent than an actual criterion for a handover from the first to the second type radio access network, the first and the second type radio access network operating with different radio access technologies.

The apparatus may further comprise means for
 initiating a handover in case the reference signal strength or quality of the measured signals fulfils a second criterion, wherein the second criterion is more stringent than the first criterion.

The apparatus may further comprise means for performing the context transfer to a target network node, which is a candidate for a possible handover, of the second type radio access network.

The apparatus may further comprise means for performing the context transfer to a set of potential target network nodes.

The apparatus may further comprise means for neglecting the context transfer as part of the actual handover preparation phase triggered by second criterion.

The apparatus may further comprise means for performing an information exchange to check the availability of the context at the target network node.

The apparatus may further comprise means for sending a context release indication to the other entities apart from the target network node.

The apparatus may further comprise means for sending a context release indication to all target network nodes to which the context transfer has been sent in advance in case the second criterion is not reached and, therefore, a handover from the first to the second type radio access network is not triggered within a defined time interval.

According to a tenth aspect of several embodiments of the invention, an apparatus is provided which comprises
 means for receiving a connection re-establishment request from a mobile node, which performs a handover from a first type radio access network to a second type radio access network, the first and the second type radio access network operating with different radio access technologies, and
 means for identifying already present context that is associated with the mobile device based on information included the connection re-establishment request.

The apparatus may further comprise means for using the information of the connection re-establishment request to fetch the context from the previous source node of the mobile node in the first type radio access network.

It is to be understood that any of the above modifications can be applied singly or in combination to the respective aspects and/or embodiments to which they refer, unless they are explicitly stated as excluding alternatives.

For the purpose of the present invention as described herein above, it should be noted that
 method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
 generally, any method step is suitable to be implemented as software or by hardware without changing the idea of the invention in terms of the functionality implemented;
 method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
 devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
 an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A method, comprising:
controlling a mobile device capable of establishing connection with a first and at least a second type radio access network, the first and the second type radio access network operating with different radio access technologies;
detecting a radio link failure;
trying, in case a radio link failure is detected when the mobile device was connected with the first type radio access network, to re-establish connection with the first type radio access network, and;
in case re-establishing the connection with the first type radio access network was not successful, trying to re-establish connection with the second type radio access network; and
checking whether information is available regarding a target node of the second type radio access network and/or information regarding a frequency to be used to start the re-establishing process with the second type radio access network.

2. The method according to claim 1, further comprising, in case the information is not available, setting the apparatus in an idle mode.

3. The method according to claim 2, further comprising:
obtaining the information based on at least one of previously carried out inter radio access technology measurements; and a received handover command message containing detailed information about the second type radio access network and a cell to which a handover is to be carried out, and/or explicit signalling from the network; and
storing the information in a memory.

4. The method according to claim 1, further comprising, in response to detection of a radio problem, and the expiration of a first timer since detection of the radio problem, determining that a radio link failure has occurred.

5. The method according to claim 1, further comprising, in response to expiration of a second timer since detection of the radio link failure, determining that re-establishing the connection with the first type radio access network was not successful.

6. The method according to claim 1, further comprising, in response to expiration of a third timer during a succession of one or more attempts at connection re-establishment with the second type radio access network, setting the apparatus in an idle mode.

7. The method according to claim 1, further comprising detecting reference signal strength and/or quality from base stations of the first and second radio access technologies and initiating a transfer of a context of the mobile device to the second radio access technology in case the signal strength or quality of the measured signals fulfils a first criterion which is less stringent than an actual criterion for a handover from the first to the second type radio access network.

8. The method according to claim 7, further comprising initiating a handover in case the reference signal strength or quality of the measured signals fulfils a second criterion, wherein the second criterion is more stringent than the first criterion.

9. The method according to claim 7, wherein the context transfer is performed to a target network node of the second type radio access network, wherein the target network node is a candidate for a possible handover.

10. The method according to claim 9, further comprising performing an information exchange to check the availability of the context at the target network node.

11. A non-transitory computer readable medium storing a program of instructions, execution of which by at least one processor configures an apparatus to carry out the method of claim 1.

12. An apparatus, comprising:
at least one processor; and
memory storing a program of instructions;
wherein the memory storing the program of instructions is configured to, with the at least one processor, cause the apparatus to at least:
detect a radio link failure affecting a transceiver capable of establishing connection with a first and at least a second type radio access network, the first and the second type radio access network operating with different radio access technologies;
in case a radio link failure is detected during the time in which the transceiver is connected with the first type radio access network, try to re-establish connection with the first type radio access network by means of the transceiver;
in case re-establishing the connection with the first type radio access network not successful, try to re-establish the connection with the second type radio access network by means of the transceiver; and
check whether information is available regarding a target node of the second type radio access network and/or information regarding a frequency to be used to start the re-establishing process with the second type radio access network.

13. The apparatus according to claim 12, wherein the apparatus is further caused to check whether information is available regarding the second type radio access network and/or information regarding a frequency to be used for connecting with the second type radio access network, and, in case the information is not available, to enter an idle mode.

14. The apparatus according to claim 13, wherein the apparatus is further caused to:
obtain the information based on one or both of previously carried out inter radio access technology measurements, and a received handover command message containing detailed information about the second type radio access network and a cell to which a handover is to be carried out and/or explicit signalling from the network; and
store the information in a memory.

* * * * *